United States Patent
Boyapalle et al.

(10) Patent No.: US 12,182,596 B2
(45) Date of Patent: Dec. 31, 2024

(54) SYSTEM AND METHOD FOR SECURE APPLICATION DOMAIN ON BARE METAL INFORMATION HANDLING SYSTEM

(71) Applicant: Dell Products L.P., Round Rock, TX (US)

(72) Inventors: Anantha K. Boyapalle, Cedar Park, TX (US); Sumanth Vidyadhara, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 497 days.

(21) Appl. No.: 17/462,088

(22) Filed: Aug. 31, 2021

(65) Prior Publication Data

US 2023/0065950 A1    Mar. 2, 2023

(51) Int. Cl.
G06F 9/455 (2018.01)
G06F 9/4401 (2018.01)
G06F 9/445 (2018.01)

(52) U.S. Cl.
CPC ........ *G06F 9/45541* (2013.01); *G06F 9/4406* (2013.01); *G06F 9/445* (2013.01); *G06F 9/45558* (2013.01); *G06F 2009/45587* (2013.01)

(58) Field of Classification Search
CPC .................................. G06F 9/45541
USPC .......................................... 718/1
See application file for complete search history.

(56) References Cited

U.S. PATENT DOCUMENTS

| | | | | |
|---|---|---|---|---|
| 8,997,205 B1* | 3/2015 | Seshadri | ................ | G06F 21/53 718/1 |
| 2012/0023322 A1* | 1/2012 | Landry | ................... | G06F 8/65 713/2 |
| 2013/0074067 A1* | 3/2013 | Chowdhry | ............. | G06F 9/468 718/1 |
| 2014/0089652 A1* | 3/2014 | Cerri | .................. | H04L 41/0803 713/2 |
| 2015/0169306 A1* | 6/2015 | Labocki | ............... | H04L 67/565 717/176 |
| 2016/0011882 A1* | 1/2016 | Johnson | .................... | G06F 8/61 713/2 |
| 2018/0300116 A1* | 10/2018 | Meytin | .................... | H04L 67/10 |
| 2018/0322269 A1* | 11/2018 | Arora | ...................... | G06F 21/33 |
| 2019/0265996 A1* | 8/2019 | Shevade | ............ | G06F 9/45558 |
| 2019/0332773 A1* | 10/2019 | Konetski | .............. | H04L 63/126 |
| 2020/0218561 A1* | 7/2020 | Lal | ...................... | H04L 67/1008 |
| 2020/0252304 A1* | 8/2020 | Franke | ............... | H04L 41/0895 |
| 2020/0285461 A1* | 9/2020 | Kumar | .................. | G06F 9/4401 |
| 2021/0096848 A1* | 4/2021 | Jayakumar | .......... | G06F 12/1441 |
| 2021/0377370 A1* | 12/2021 | Chung | ................ | H04L 43/0817 |

(Continued)

*Primary Examiner* — Mehran Kamran
(74) *Attorney, Agent, or Firm* — Terrile, Cannatti & Chambers, LLP; Emmanuel A. Rivera

(57) ABSTRACT

A system, method, and computer-readable medium are disclosed for servicing and managing a bare metal information handling system. An embedded lightweight operating system on the bare metal information handling system is booted up. The embedded lightweight operating system initiates a platform inference engine which is provided rules and policies as to applications to be run on the bare metal information handling system. The platform inference engine initiates a secure workspace launcher to launch a user workspace user experience environment. The user workspace user experience environment is provided on the bare metal information handling system.

17 Claims, 4 Drawing Sheets

(56) References Cited

U.S. PATENT DOCUMENTS

| | | | | |
|---|---|---|---|---|
| 2021/0392039 | A1* | 12/2021 | Atur | H04L 67/34 |
| 2022/0004623 | A1* | 1/2022 | Trabelsi | H04L 63/029 |
| 2022/0121741 | A1* | 4/2022 | Araujo | G06F 21/566 |
| 2022/0124150 | A1* | 4/2022 | Alagna | H04L 61/4511 |
| 2022/0141088 | A1* | 5/2022 | Bandyopadhyay | H04L 41/0895 |
| | | | | 709/222 |
| 2022/0269494 | A1* | 8/2022 | Malleni | G06F 9/45541 |
| 2022/0318023 | A1* | 10/2022 | Bilal | G06F 9/4406 |
| 2022/0342649 | A1* | 10/2022 | Cao | G06F 8/61 |
| 2022/0342707 | A1* | 10/2022 | Alagna | H04L 67/1008 |
| 2023/0025529 | A1* | 1/2023 | Fu | G06F 9/4406 |
| 2023/0064313 | A1* | 3/2023 | Chen | G06F 9/45541 |
| 2023/0065950 | A1* | 3/2023 | Boyapalle | G06F 9/445 |
| 2023/0305869 | A1* | 9/2023 | Traeger | G06F 9/45541 |
| 2024/0012630 | A1* | 1/2024 | Huang | G06F 8/61 |

* cited by examiner

SYSTEM AND METHOD FOR SECURE APPLICATION DOMAIN ON BARE METAL INFORMATION HANDLING SYSTEM

BACKGROUND OF THE INVENTION

Field of the Invention

The present invention relates to the management of information handling systems. More specifically, embodiments of the invention provide a system, method, and computer-readable medium for a secure application domain on a bare metal information handling system using secure namespace isolation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In certain instances, an information handling system can be implemented as a "bare metal" device, which is not populated with software applications and an operating system running the applications. Such bare metal information handling systems can be provided a workspace that includes workloads or applications.

A bare metal information handling systems utilizing the workspace can run as a cloud-native ("cloud") or endpoint native ("endpoint"), which allows the information handling to be productive. that are necessary for the user to be productive. It is desirable, that bare metal information handling systems be managed, such as by an information technology (IT) management of an entity or business. For example, information technology (IT) management of the entity, may provide workspace management, security management, and system maintenance of information handling systems.

It is also desirable, to provide to provide orchestration, optimization of information handling systems, and composition for user interface/user experience that is operating system and chipset agnostic. As endpoint or edge computing devices, bare metal information handling systems should be serviceable and manageable.

SUMMARY OF THE INVENTION

A system, method, and computer-readable medium are disclosed for servicing and managing a bare metal information handling system, comprising: booting up an embedded lightweight operating system on the bare metal information handling system; initiating a platform inference engine by the embedded lightweight operating system, wherein the platform inference engine is provided rules and policies as to applications to be run on the bare metal information handling system; initiating a secure workspace launcher to launch a user workspace user experience environment; and providing the user workspace user experience environment on the bare metal information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
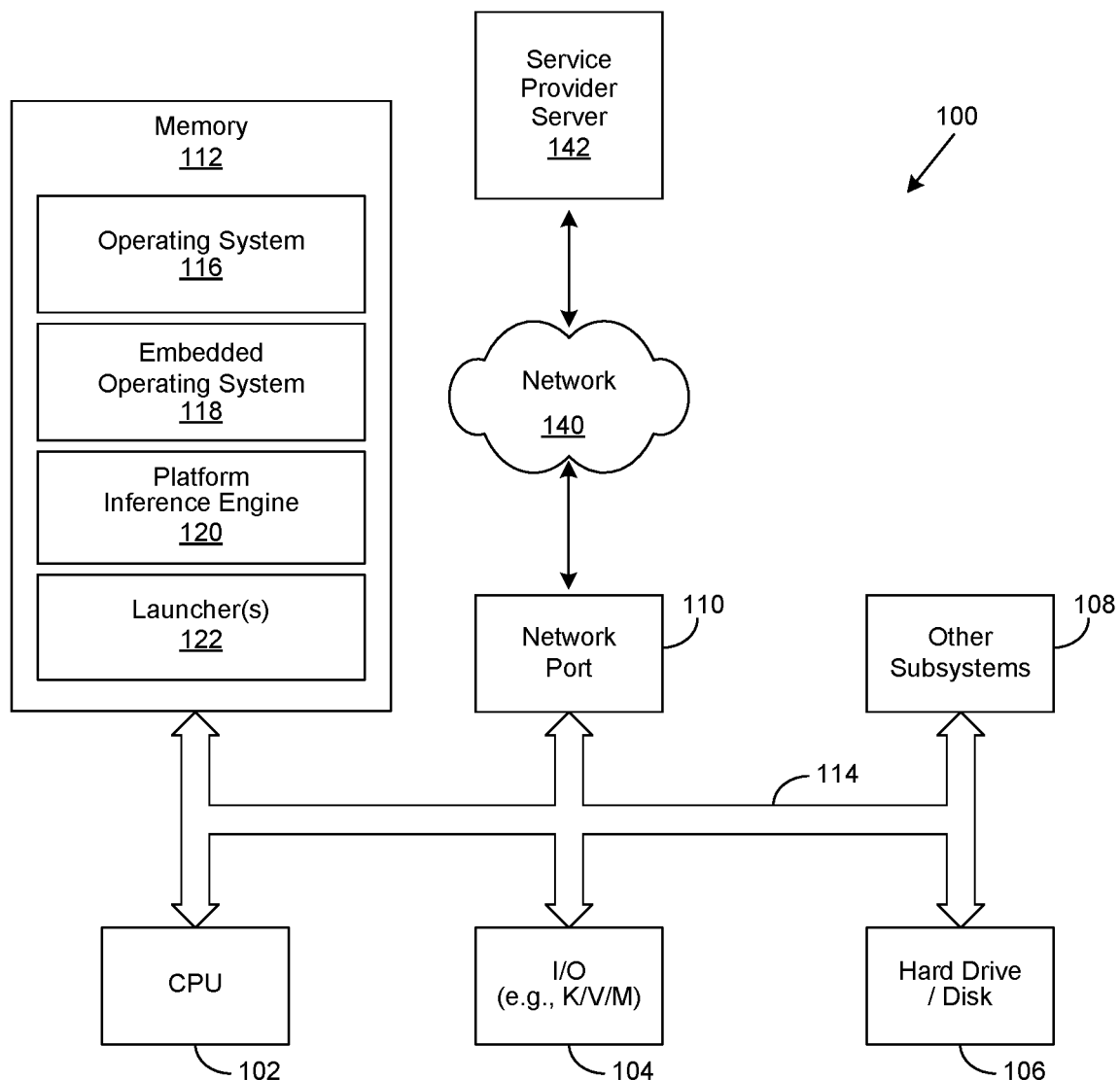
FIG. 1 is a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a microphone, a keyboard, a video/display, a mouse, and associated controllers (e.g., K/V/M), a hard drive or disk storage 106, and various other subsystems 108.

In various embodiments, the information handling system 100 also includes network port 110 operable to connect to a network 140, where network 140 can include one or more wired and wireless networks, including the Internet. Network 140 is likewise accessible by a service provider server 142. The information handling system 100 likewise includes system memory 112, which is interconnected to the foregoing via one or more buses 114. System memory 112 can be implemented as hardware, firmware, software, or a combination of such.

System memory 112 further include operating system (OS) 116. In various embodiments, OS 116 manages all of the software and hardware on the information handling system 100. In bare metal implementations, the OS 116 can be downloaded after initiating a workspaces as described herein. Implementations provide for the system memory 112 to include an embedded operating system 118, a platform inference engine 120, and launcher(s) 122 which are further described herein.

Figure 2:
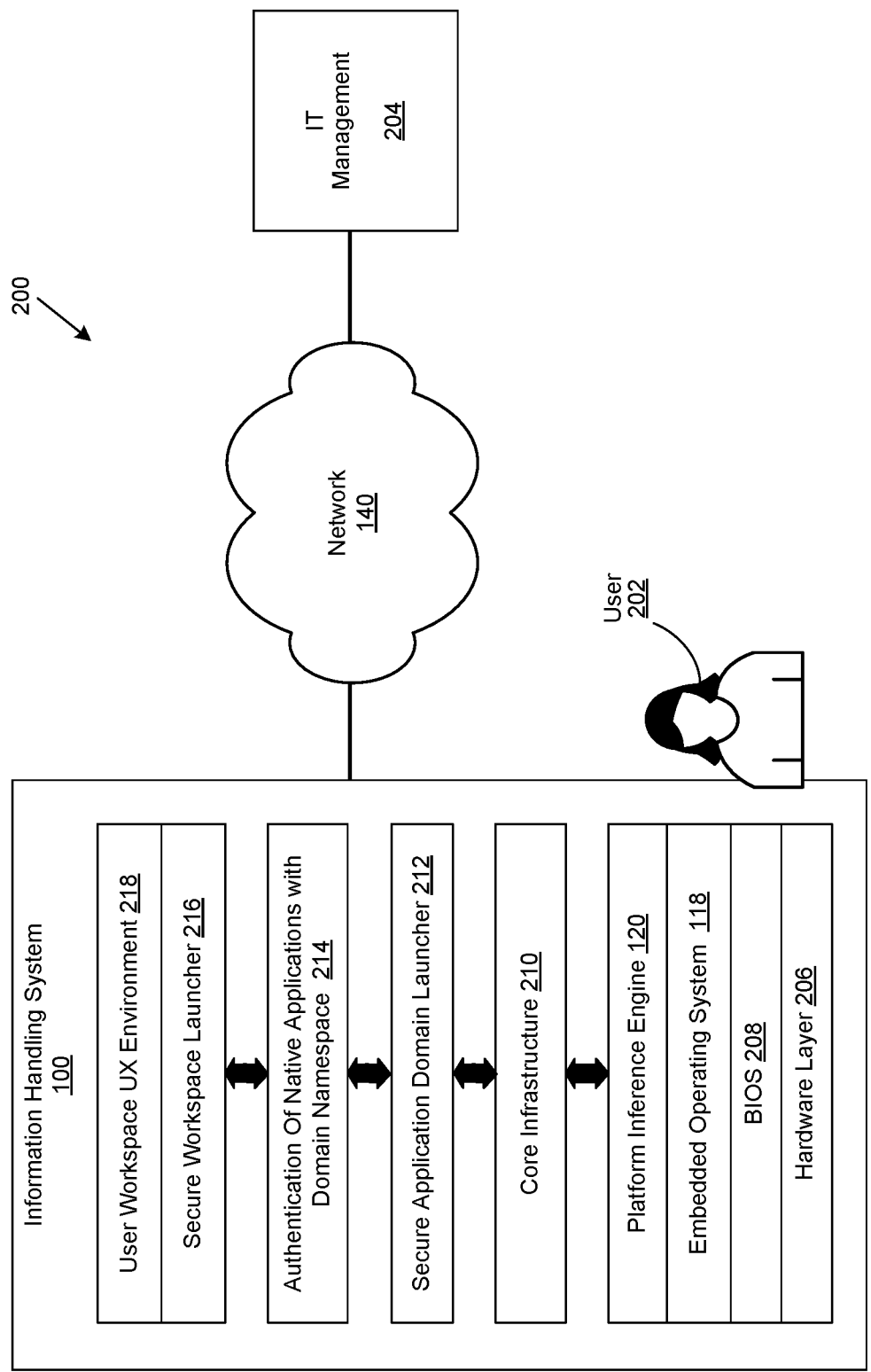
FIG. 2 is an example of a system for secure application domain on bare metal information handling systems.

FIG. 2 shows a system for secure application domain on bare metal information handling systems. The system 200 includes bare metal information handling system 100 which is associated with a user 202. Implementations provide for the bare metal information handling system 100 to be connected to information technology (IT) management 204 through network 140. IT management 204 can provide or define policies applicable the bare metal information handling system 100 and user 202. Furthermore, through the components implemented by bare metal information handling system 100, the IT management 204 can support user 202 authentication and determine applications that are to be launched at bare metal information handling system 100. Furthermore, communication between bare metal information handling system 100 and IT management 204 allow IT management 204 to service and manage bare metal information handling system 100.

The bare metal information handling system 100 includes a hardware layer 206 and BIOS 208. Implementations provide for the embedded operating system 118 to reside in the BIOS 208. Embodiments include for the embedded operating system 118 to be a lightweight operating system. The embedded operating system 118 is a "pre-boot" operating system that boots up with a secure boot authenticated infrastructure, for example implementing embedded Linux.

When the embedded operating system 118 is initiated, initializing can be performed for native applications (e.g., X11 interface), container runtime (e.g., docker engine), and a security infrastructure. Implementations also provide for the embedded operating system 118 to initialize an internal infrastructure based on each platform inference rules that it receives from platform inference engine 120.

The platform inference engine 120 connects to a core infrastructure 210. Implementations provide for the core infrastructure to include a container engine (e.g., Docker engine), security infrastructure, a .NET core user interface liberty, native applications, policies, etc. The container engine is an infrastructure that user 202 needs, such as office applications, design applications, etc.

The platform inference engine 120 is connected to the embedded operating system 118. In pre-boot environment, the platform inference engine 120 receives inference rules, where the inference rules can be received out of band, in band, through a cloud resource, etc. Inference rules can also be derived from BIOS 208 boot behavior, where a platform posts errors. Inference rules can also be derived from configuration tools.

The platform inference engine 120 invokes launcher(s) 122. Implementations provide for platform inference engine 120 to invoke a secure application domain launcher 212. The secure application domain launcher 212 initiates authentication of native applications with domain namespace 214. Implementations therefore provide for secure application domain of native applications on the bare metal information handling system 100 using secure namespace isolation.

Implementations can also provide for the platform inference engine 120 to invoke a secure workspace launcher 216. The secure workspace launcher 216 launches a user workspace user experience (UX) environment 218. The secure workspace launcher 216 launches the user workspace UX environment 218 via a virtual machine manager (VMM) or through a container environment (e.g., Docker container). The user workspace UX environment 218 provides for an interface for user 202 to interact with, and further provides for applications, policies (e.g., policies set by IT management 204), storage of applications, etc. that user 202 needs on the bare metal information handling system 100. IT management 204 particularly controls and manages the user workspace UX environment 218 based on the policies that are set by the IT management 204. The user workspace UX environment 218 is implemented to be operating system and chipset agnostic.

Figure 3:
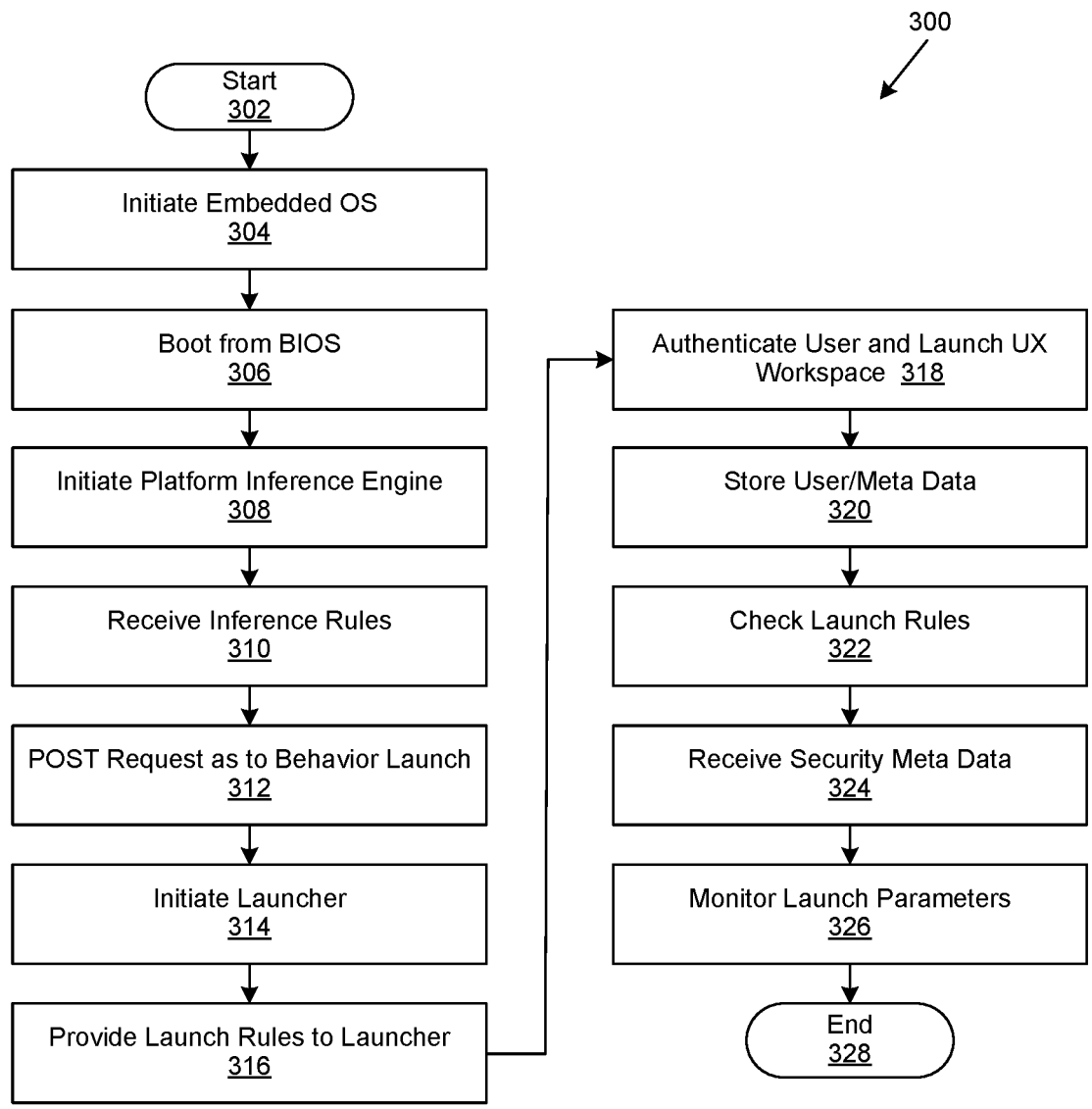
FIG. 3 is a generalized flowchart for implementing secure application domain on bare metal information handling systems.

FIG. 3 is a generalized flowchart 300 for implementing secure application domain on bare metal information handling systems. In certain implementations, the process 300 is performed by the information handling system 100 described in FIG. 1 and FIG. 2. The order in which the method is described is not intended to be construed as a limitation, and any number of the described method blocks may be combined in any order to implement the method, or alternate method.

At step 302, the process 300 starts. At step 304, the embedded operating system 118 is initiated. As discussed, initializing can be performed for native applications (e.g., X11 interface), container runtime (e.g., docker engine), and a security infrastructure. Implementations also provide for the embedded operating system 118 to initialize an internal infrastructure based on each platform inference rules that it receives from platform inference engine 120.

At step 306, in certain implementations the embedded operating system 118 is booted up from the BIOS 208. As discussed, the embedded operating system 118 can be a "pre-boot" operating system that boots up with a secure boot authenticated infrastructure. For example, the embedded operating system 118 can be implemented embedded Linux.

At step 308, the embedded operating system 118 initiates the platform inference engine 120. As discussed, the platform inference engine 120 connects to core infrastructure 210. Implementations provide for the core infrastructure to include a container engine (e.g., Docker engine), security infrastructure, a .NET core user interface liberty, native applications, policies, etc.

As discussed, implementations further provide for the platform inference engine 120 to invoke secure application domain launcher 212. The secure application domain launcher 212 initiates authentication of native applications with domain namespace 214.

At step 310, interference rules are received by the platform inference engine 120, as discussed where the inference rules can be received out of band, in band, through a cloud resource, etc. Inference rules can also be derived from BIOS 208 boot behavior, where a platform posts errors. Inference rules can also be derived from configuration tools.

At step 312, a POST request as to launch behavior is sent from the embedded operating system 118 to the platform inference engine 120. At step 314, launcher(s) 112 are initiated, and particularly, the secure workspace launcher 216. At step 316, the platform inference engine 120 provides launch rules to the secure workspace launcher 216.

At step 318, the secure workspace launcher 216 authenticates user 202 and launches the user workspace UX environment 218. At step 320, the secure workspace launcher 216 stores user and meta data. At step 322, the platform inference engine 120 checks launch rules received from the secure workspace launcher 216. At step 324, the embedded operating system 118 receives security meta data from the platform inference engine 120. At step 326, the embedded operating system 118 monitors launch parameters.

Figure 4:
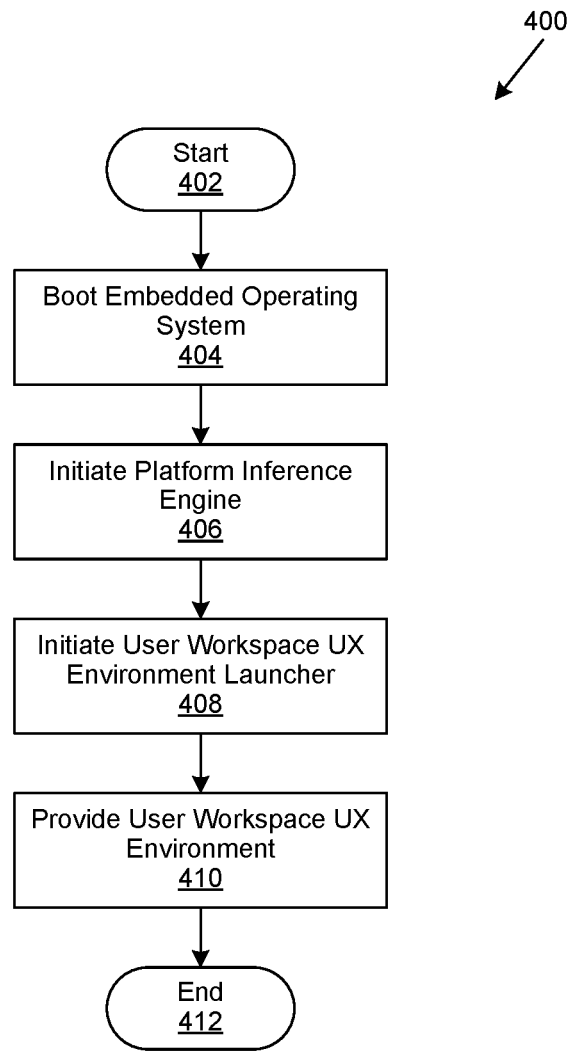
FIG. 4 is a generalized flowchart for servicing and managing bare metal information handling systems.

FIG. 4 is a generalized flowchart 400 for servicing and managing bare metal information handling systems. In certain implementations, the process 400 is performed by the information handling system 100 described in FIG. 1 and FIG. 2. The order in which the method is described is not intended to be construed as a limitation, and any number of the described method blocks may be combined in any order to implement the method, or alternate method.

At step 402, the process 400 starts. At step 404, the embedded operating system 118 is initiated and booted up. As discussed, initializing can be performed for native applications (e.g., X11 interface), container runtime (e.g., docker engine), and a security infrastructure. Implementations also provide for the embedded operating system 118 to initialize an internal infrastructure based on each platform inference rules that it receives from platform inference engine 120. Certain implementations provide for the embedded operating system 118 to booted up from the BIOS 208. As discussed, the embedded operating system 118 can be a "pre-boot" operating system that boots up with a secure boot authenticated infrastructure. For example, the embedded operating system 118 can be implemented embedded Linux.

At step 406, the platform inference engine 120 is initiated. As discussed, the platform inference engine 120 connects to core infrastructure 210. Implementations provide for the core infrastructure to include a container engine (e.g., Docker engine), security infrastructure, a .NET core user interface liberty, native applications, policies, etc. As discussed, implementations provide for the platform inference engine 120 to invoke secure application domain launcher 212. The secure application domain launcher 212 initiates authentication of native applications with domain namespace 214.

At step 406, the platform inference engine 120 initiates the secure workspace launcher 216. The platform inference engine 120 provides launch rules to the secure workspace launcher 216. The secure workspace launcher 216 launches user workspace UX environment 218.

At step 408, the user workspace UX environment 218 is provided. As discussed, the user workspace UX environment 218 provides for an interface for user 202 to interact with, and further provides for applications, policies (e.g., policies set by IT management 204), storage of applications, etc. that user 202 needs on the bare metal information handling system 100. IT management 204 particularly controls and manages the user workspace UX environment 218 based on the policies that are set by the IT management 204.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for servicing and managing a bare metal information handling system, comprising:
   booting up an embedded lightweight operating system on the bare metal information handling system;
   initiating a platform inference engine by the embedded lightweight operating system, wherein the platform inference engine is provided inference rules and policies as to applications to be run on the bare metal information handling system, wherein the platform inference engine receives inference rules from one or more of the following: out of band of the embedded lightweight operating system, in band of the embedded lightweight operating system, cloud resource, BIOS boot behavior, wherein the platform inference engine is connected to a core infrastructure that includes a container engine that includes an infrastructure with the applications;
   initiating a secure workspace launcher to launch a user workspace user experience environment; and
   providing the user workspace user experience environment on the bare metal information handling system.

2. The method of claim 1, wherein the booting is from BIOS on the information handling system.

3. The method of claim 1, wherein the inference rules and policies are set by an information technology management unit.

4. The method of claim 1, wherein the platform inference engine further invokes a secure domain name launcher that initiates native application with domain namespace.

5. The method of claim 1, wherein the secure workspace launcher launches a user workspace user experience environment through a virtual machine manager or through a container environment.

6. The method of claim 1, wherein user workspace user experience environment provides for applications, policies, and storage of applications.

7. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations for servicing and managing a bare metal information handling system and comprising instructions executable by the processor and configured for:
      booting up an embedded lightweight operating system on the bare metal information handling system;
      initiating a platform inference engine by the embedded lightweight operating system, wherein the platform inference engine is provided inference rules and policies as to applications to be run on the bare metal information handling system, wherein the platform inference engine receives inference rules from one or more of the following: out of band of the embedded lightweight operating system, in band of the embedded lightweight operating system, cloud resource, BIOS boot behavior, wherein the platform inference engine is connected to a core infrastructure that includes a container engine that includes an infrastructure with the applications;
      initiating a secure workspace launcher to launch a user workspace user experience environment; and
      providing the user workspace user experience environment on the bare metal information handling system.

8. The system of claim 7, wherein the booting is from BIOS on the information handling system.

9. The system of claim 7, wherein the inference rules and policies are set by an information technology management unit.

10. The system of claim 7, wherein the platform inference engine further invokes a secure domain name launcher that initiates native application with domain namespace.

11. The system of claim 7, wherein the secure workspace launcher launches a user workspace user experience environment through a virtual machine manager or through a container environment.

12. The system of claim 7, wherein user workspace user experience environment provides for applications, policies, and storage of applications.

13. A non-transitory, computer-readable storage medium embodying computer program code, the computer program code comprising computer executable instructions configured for:
   booting up an embedded lightweight operating system on the bare metal information handling system;
   initiating a platform inference engine by the embedded lightweight operating system, wherein the platform inference engine is provided inference rules and policies as to applications to be run on the bare metal information handling system, wherein the platform inference engine receives inference rules from one or more of the following: out of band of the embedded lightweight operating system, in band of the embedded lightweight operating system, cloud resource, BIOS boot behavior, wherein the platform inference engine is connected to a core infrastructure that includes a container engine that includes an infrastructure with the applications;
   initiating a secure workspace launcher to launch a user workspace user experience environment; and
   providing the user workspace user experience environment on the bare metal information handling system.

14. The non-transitory, computer-readable storage medium of claim 13, wherein the inference rules and policies are set by an information technology management unit.

15. The non-transitory, computer-readable storage medium of claim 13, wherein the platform inference engine further invokes a secure domain name launcher that initiates native application with domain namespace.

16. The non-transitory, computer-readable storage medium of claim 13, wherein the secure workspace launcher launches a user workspace user experience environment through a virtual machine manager or through a container environment.

17. The non-transitory, computer-readable storage medium of claim 13, wherein user workspace user experience environment provides for applications, policies, and storage of applications.

\* \* \* \* \*